US009520791B2

(12) United States Patent
Wu et al.

(10) Patent No.: US 9,520,791 B2
(45) Date of Patent: Dec. 13, 2016

(54) POWER CONTROLLER WITH MULTI-FUNCTION PIN AND POWER SUPPLY USING THE SAME

(71) Applicant: Leadtrend Technology Corp., Hsin-Chu (TW)

(72) Inventors: Chin-Ho Wu, Hsin-Chu (TW); Ren-Yi Chen, Hsin-Chu (TW); Yi-Shan Chu, Hsin-Chu (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 13/798,148

(22) Filed: Mar. 13, 2013

(65) Prior Publication Data

US 2013/0301302 A1   Nov. 14, 2013

(30) Foreign Application Priority Data

May 11, 2012 (TW) .............................. 101116751 A

(51) Int. Cl.
*H02M 3/335* (2006.01)
*H02M 3/325* (2006.01)
*H02M 1/32* (2007.01)

(52) U.S. Cl.
CPC ......... *H02M 3/325* (2013.01); *H02M 3/33507* (2013.01); *H02M 2001/327* (2013.01)

(58) Field of Classification Search
CPC .............. H02M 3/325; H02M 3/33507; H02M 2001/327
USPC ...... 323/271, 276, 282–285, 351; 363/21.04, 363/21.08, 21.12, 21.16, 50, 56.09, 56.1, 56.11, 363/97; 361/18, 35, 37
See application file for complete search history.

(56) References Cited

U.S. PATENT DOCUMENTS

| | | | |
|---|---|---|---|
| 4,823,070 A * | 4/1989 | Nelson | 323/285 |
| 6,313,976 B1 * | 11/2001 | Balakrishnan et al. | 361/79 |
| 7,978,487 B2 * | 7/2011 | Lin | 363/55 |
| 8,482,938 B2 * | 7/2013 | Balakrishnan et al. | 363/21.01 |
| 2009/0295348 A1 * | 12/2009 | Tao et al. | 323/282 |
| 2010/0315846 A1 * | 12/2010 | Lin | 363/50 |
| 2012/0206117 A1 * | 8/2012 | Yang et al. | 323/282 |
| 2012/0224397 A1 * | 9/2012 | Yeh | 363/21.12 |
| 2012/0229031 A1 * | 9/2012 | Shiu et al. | 315/122 |
| 2012/0320640 A1 * | 12/2012 | Baurle et al. | 363/21.17 |
| 2013/0100715 A1 * | 4/2013 | Lin et al. | 363/21.17 |
| 2013/0121044 A1 * | 5/2013 | Gao et al. | 363/50 |

FOREIGN PATENT DOCUMENTS

| | | | | |
|---|---|---|---|---|
| CN | 202004651 U | * | 10/2011 | ............. H02M 7/00 |
| CN | 103036454 A | | 4/2013 | |
| TW | 201145790 A1 | | 12/2011 | |
| TW | M422238 U | * | 2/2012 | ............. H02M 7/00 |
| TW | M422238 U1 | | 2/2012 | |

* cited by examiner

*Primary Examiner* — Jessica Han
*Assistant Examiner* — Ivan Laboy Andino
(74) *Attorney, Agent, or Firm* — Winston Hsu; Scott Margo

(57) ABSTRACT

Power supplies and power controllers are disclosed. A disclosed power supply has a power controller, a power switch, an auxiliary winding, a first circuit and a second circuit. The power controller is a monolithic integrated circuit with a multi-function pin and a gate pin. A control node of the power switch is coupled to the gate pin. The first circuit is coupled between the multi-function pin and the auxiliary winding and has a diode. The second circuit is coupled between the multi-function pin and a ground line, and has a thermistor.

10 Claims, 5 Drawing Sheets

POWER CONTROLLER WITH MULTI-FUNCTION PIN AND POWER SUPPLY USING THE SAME

BACKGROUND OF THE INVENTION

1. Field of the Invention

The present invention relates to a power supply, and particularly to safe protection of a power supply.

2. Description of the Prior Art

Almost each electronic product needs a power supply to convert power generated by an external power source (e.g. an alternating current line or a battery) into power required by a core circuit of the electronic product. A quadrature resonance (QR) power supply can reduce switching loss of a power switch of the electronic product. In various power supplies, conversion efficiency of the QR power supply is better in theory, so the QR power supply is one of the popular power supplies.

FIG. 1 is a diagram illustrating a QR power supply 8 according to the prior art. As shown in FIG. 1, a converter 10 is a flyback converter, and a QR power controller 18 can be a monolithic integrated circuit with six pins VCC, GND, GATE, CS, FB, and QRD. The pin GATE of the power controller 18 is coupled to a control terminal of a power switch 15 to control store power and release power of a primary winding PRM. A feedback circuit 20 is used for detecting a voltage of an output terminal OUT to generate and output a feedback signal $V_{FB}$ to the pin FB of the QR power controller 18. The pin VCC provides power to the QR power controller 18. The QR power controller 18 can detect a through the power switch 15 or the primary winding PRM through the pin CS. A VCC power supply 12 utilizes discharge of an auxiliary winding AUX to generate the power required by the QR power controller 18 on the pin VCC. Divider resistors 14 and 13 are coupled between the auxiliary winding AUX and a ground line in series, so a voltage of the pin QRD can correspond to a voltage signal $V_{AUX}$ of the auxiliary winding AUX.

FIG. 2 is a diagram illustrating waveforms of signals in FIG. 1, where the voltage signal $V_{AUX}$ representing a voltage drop of the auxiliary winding AUX and a gate signal $V_{GATE}$ representing a voltage of the pin GATE are listed from top to down. The QR power controller 18 detects whether the voltage signal $V_{AUX}$ drops across 0V through the QR detection pin QRD. After the voltage signal $V_{AUX}$ drops across 0V for a delay time Δt, the QR power controller 18 enables the gate signal $V_{GATE}$ to expect that the power switch 15 realizes valley switching. That is to say, the power switch 15 is turned on to enters an ON time $T_{ON}$ of a next switching period when the voltage signal $V_{AUX}$ is close to a minimum value, where the valley switching can effectively reduce switching loss of the power switch 15.

Generally speaking, a power supply not only needs to emphasize conversion efficiency, but also needs some protection functions, such as an over voltage protection (OVP), an over current protection (OCP), an over load protection (OLP), an over temperature protection (OTP), and so on. However, how to implement the above mentioned protection functions in an integrated circuit having limited pins often requires ingenuity and experience. That is to say, how to implement the above mentioned protection functions in the integrated circuit having limited pins is very difficult.

SUMMARY OF THE INVENTION

An embodiment provides a power supply. The power supply includes a power controller, a power switch, an auxiliary winding, a first circuit, and a second circuit. The power controller is a monolithic integrated circuit and has a multi-function pin and a gate pin. The power switch has a control terminal coupled to the gate pin. The first circuit coupled between the multi-function pin and the auxiliary winding has a diode. The second circuit coupled between the multi-function pin and the ground line has a thermistor.

Another embodiment provides a power controller. The power controller is a monolithic integrated circuit. The power controller has a gate pin, a multi-function pin, a resistance detector, and a quadrature resonance detector, where the gate pin is used for outputting a gate signal. When the gate signal is enabled, the resistance detector is used for detecting a resistance between the multi-function pin and a ground line. When the resistance is lower than a predetermined value, the resistance detector enables a protection signal. When the gate signal is disabled, the quadrature resonance detector is used for detecting a discharge time of an external inductor through the multi-function pin to enable a trigger signal. The trigger signal enables the gate signal, and the enabled protection signal keeps the gate signal not being enabled.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
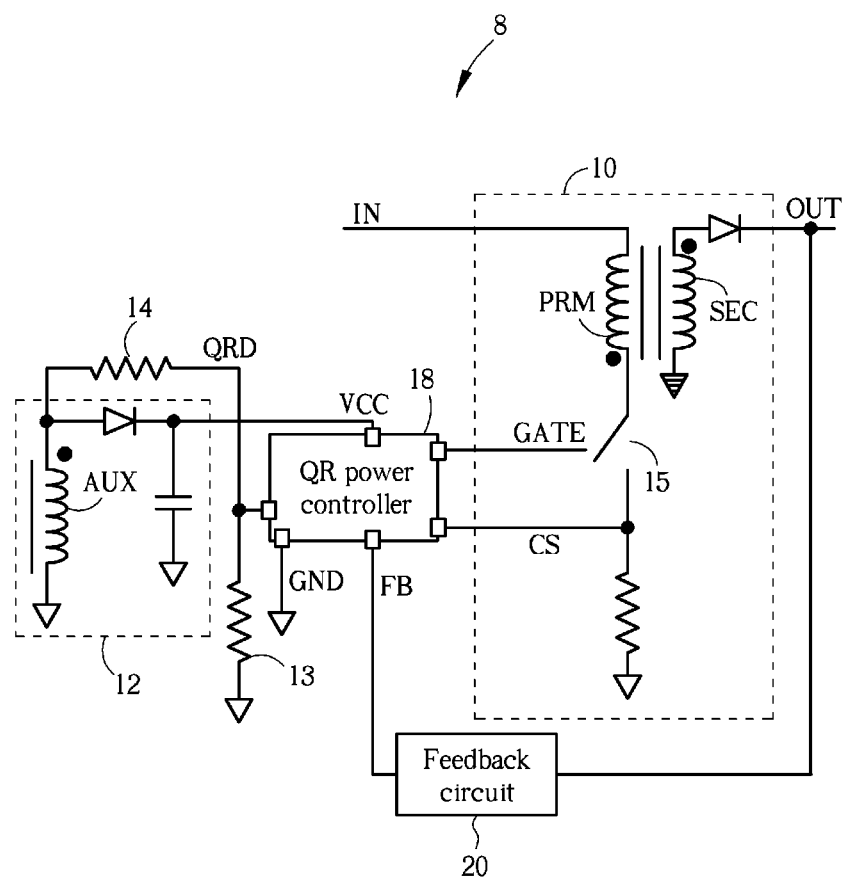
FIG. 1 is a diagram illustrating a QR power supply according to the prior art.
Figure 2:
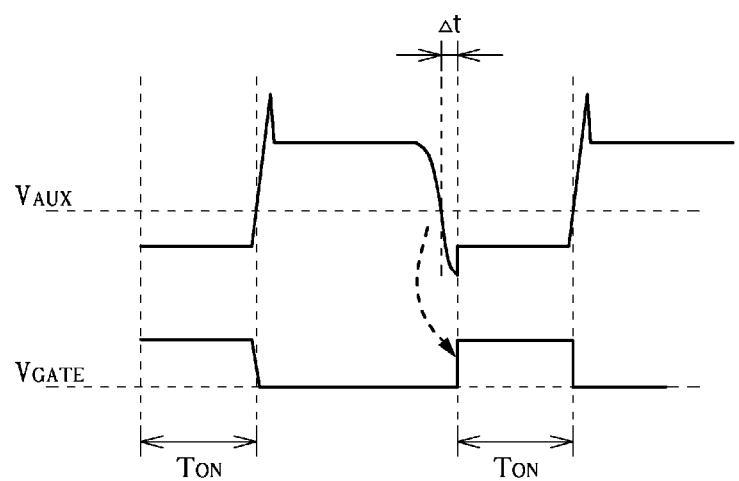
FIG. 2 is a diagram illustrating waveforms of signals in FIG. 1.
Figure 3:
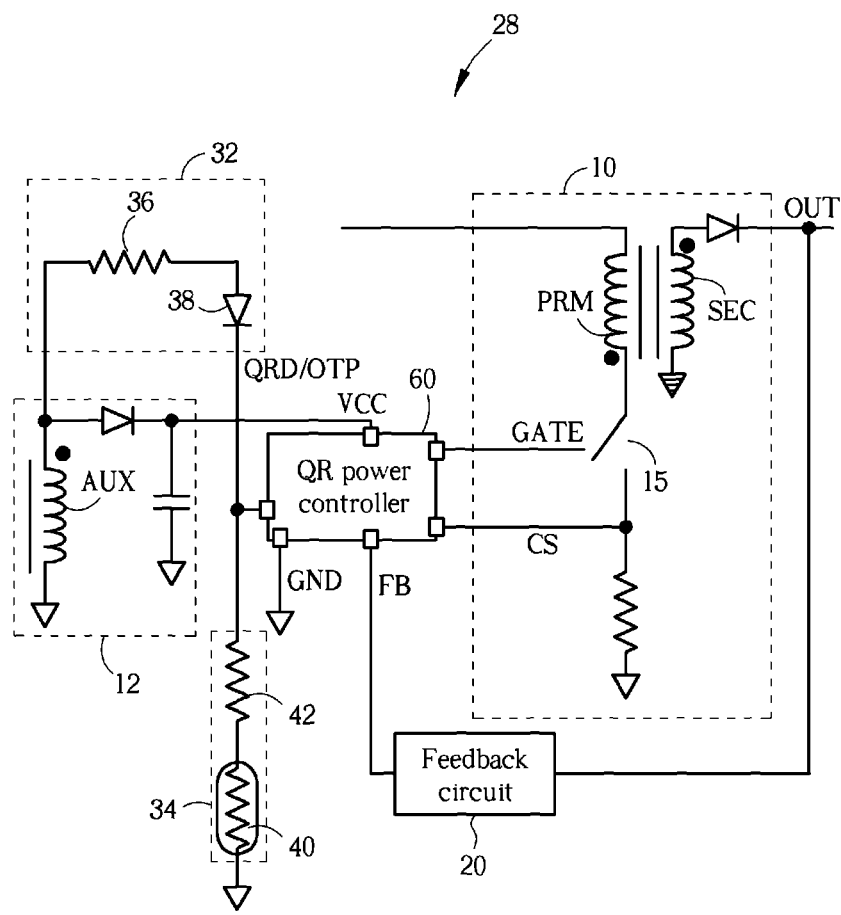
FIG. 3 is a diagram illustrating a quadrature resonance power supply according to an embodiment.

FIG. 3 is a diagram illustrating a quadrature resonance (QR) power supply 28 according to an embodiment, where the parts in FIG. 3 which are the same as those in FIG. 1 are omitted for simplicity.

QR power controller 60 can be a monolithic integrated circuit and have six pins VCC, GND GATE, CS, FB, and QRD/OTP. The pin QRD/OTP is a multi-function pin which simultaneously has QR detection and an over temperature protection (OTP) functions. A circuit 32 coupled between an auxiliary winding AUX and the pin QRD/OTP includes a resistor 36 and a diode 38, where the resistor 36 is connected to the diode 38 in series. A circuit 34 coupled between the pin QRD/OTP and a ground line includes a resistor 42 and a thermistor 40, where the resistor 42 is connected to the thermistor 40 in series. A thermistor means that a resistance of a resistor can be significantly varied with an ambient temperature, where a temperature coefficient thereof can be positive or negative. In the disclosed embodiment, the thermistor 40 is a negative temperature coefficient (NTC) thermistor. However, in another embodiment of the present invention can utilize a positive temperature coefficient (PTC) thermistor.

Figure 4:
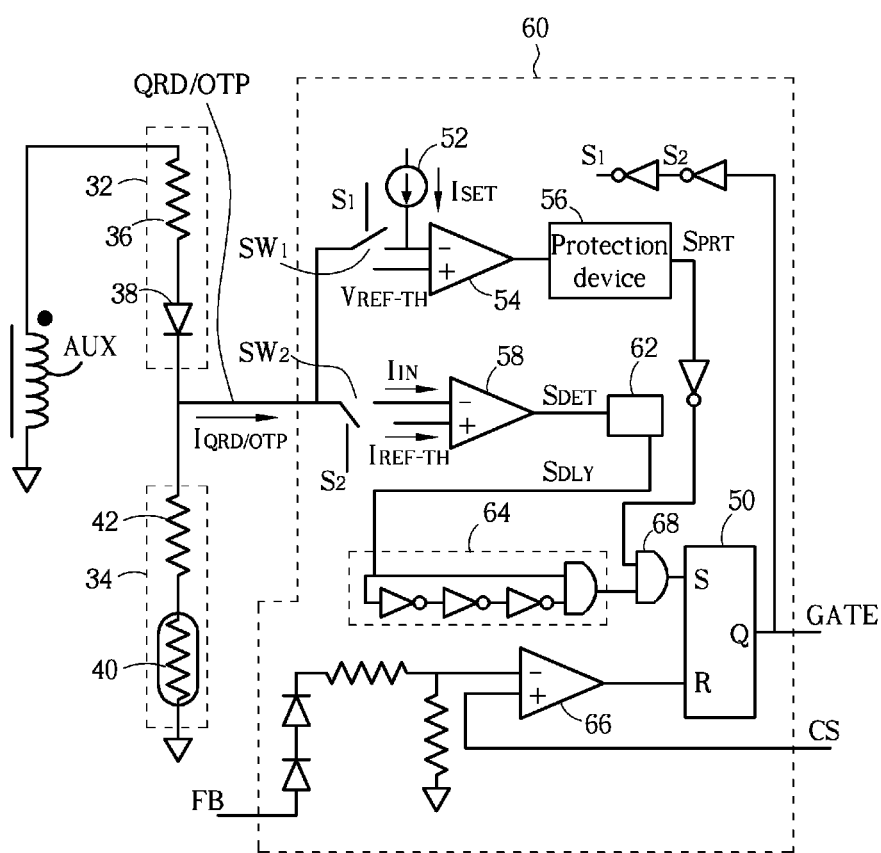
FIG. 4 is a diagram illustrating parts of the circuits in FIG. 3 and circuits within the QR power controller.
Figure 5:
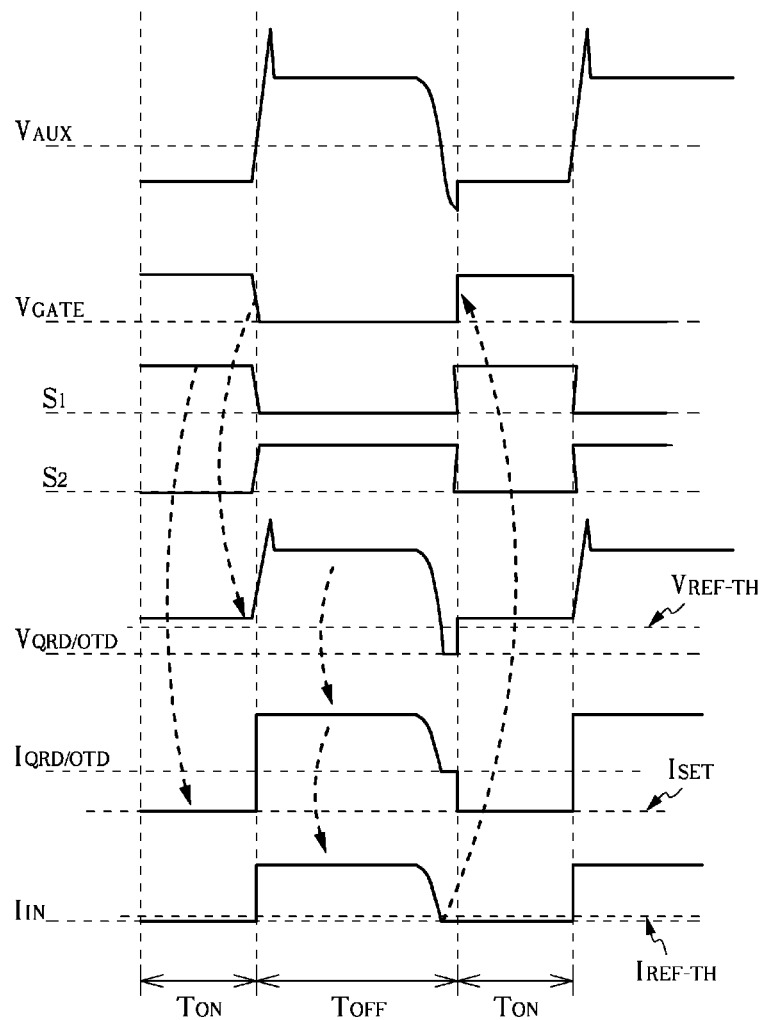
FIG. 5 is a diagram illustrating waveforms of signals in FIG. 4.

FIG. 4 is a diagram illustrating parts of the circuits in FIG. 3 and circuits within the QR power controller 60. FIG. 5 is a diagram illustrating waveforms of signals in FIG. 4, where a voltage signal $V_{AUX}$, a gate signal $V_{GATE}$, a signal $S_1$, a signal $S_2$, a voltage signal $V_{QRD/OTP}$ of the pin QRD/OTP, a current signal $I_{QRD/OTP}$ inputted to the power controller 60 from the pin QRD/OTP, and a current signal $I_{IN}$ inputted to a current comparator 58 are listed from top to down.

Please refer to FIG. 4 and FIG. 5 simultaneously. As shown in FIG. 4 and FIG. 5, the signal $S_1$ is equal to the gate signal $V_{GATE}$ and the signal $S_2$ and the gate signal $V_{GATE}$ are in inverse in logic. When the gate signal $V_{GATE}$ is enabled and the power switch 15 is turned on during an ON time $T_{ON}$, the signal $S_1$ makes the switch $SW_1$ be turned on and short-circuited; the signal $S_2$ makes switch $SW_2$ be turned off and open-circuited. On the other hand, during an OFF time $T_{OFF}$ (the gate signal $V_{GATE}$ is disabled), the switch $SW_1$ is turned off and the switch $SW_2$ is turned on. As shown in FIG. 4, when a voltage signal $V_{CS}$ exceeds a value corresponding to a feedback signal $V_{FB}$ of the feedback pin FB, the comparator 66 can finish the ON time $T_{ON}$ through a SR register 50. It is described later that when the voltage signal $V_{AUX}$ is close to a minimum value, a signal path composed of the current comparator 58, a delay device 62, a pulse generator 64, and an AND gate 68 can set the SR register 50 to finish the OFF time $T_{OFF}$.

When the signal $S_1$ is enabled and the signal $S_2$ is disabled, because the voltage signal $V_{AUX}$ is negative, the diode 38 has a reverse bias, and a constant current $I_{SET}$ provided by a current source 52 can flow the short-circuited switch $SW_1$, the pin QRD/OTP, and the resistor 42 and the thermistor 40 of the circuit 34 to the ground line. Meanwhile, the current signal $I_{QRD/OTP}$ is in reverse of the constant current $I_{SET}$. The voltage comparator 54 compares the voltage signal $V_{QRD/OTP}$ of the pin QRD/OTP with a constant reference voltage $V_{REF-TH}$. In the embodiment, the current source 52 and the voltage comparator 54 of the power controller 60 can be regarded as a resistance detector which can utilize the constant current $I_{SET}$ to detect a resistance of the circuit 34. If the resistance of the circuit 34 is higher than a ratio ($V_{REF-TH}/I_{SET}$) of the reference voltage $V_{REF-TH}$ to the constant current $I_{SET}$, it means that a temperature of the thermistor 40 is not high enough, so a resistance of thermistor 40 is still at an acceptable high level, resulting in the voltage comparator 54 not triggering a protection device 56 to enable a protection signal $S_{PRT}$. Therefore, a pulse generated by a pulse generator 64 can pass an AND gate 68 to an S terminal of the SR register 50. On the other hand, if the resistance of the circuit 34 is lower than the ratio ($V_{REF-TH}/I_{SET}$), the voltage comparator 54 determined that the temperature of the thermistor 40 is too high, so the voltage comparator 54 triggers the protection device 56 to enable the protection signal $S_{PRT}$. Therefore, the S terminal of the SR register 50 can be kept at a logic-low value "0", resulting in the power switch 15 not being turned on to stop further power conversion. In one embodiment, when the resistance of the circuit 34 is higher than the ratio ($V_{REF-TH}/I_{SET}$) again, the QR power controller 60 disables the protection signal $S_{PRT}$ to automatically recover the power conversion. In another embodiment, the protection signal $S_{PRT}$ is latched, so when a voltage of the pin VCC of the QR power controller 60 needs to be lower than a predetermine value, the QR power controller 60 delatches the protection signal $S_{PRT}$ to automatically recover the power conversion.

When the switch $SW_1$ is turned off and the switch $SW_2$ is turned on (just enters the OFF time $T_{OFF}$), because the voltage signal $V_{AUX}$ is positive, the diode 38 has a forward bias. Meanwhile, the current signal $I_{IN}$ is roughly the same as the current signal $I_{QRD/OTP}$. For example, a negative terminal of the current comparator 58 can be roughly kept at a fixed voltage to sink to generate the current signal $I_{IN}$ from the pin QRD/OTP. The current comparator 58 compares the current signal $I_{IN}$ with a reference current $I_{REF-TH}$. When the auxiliary winding AUX discharges completely, the voltage signal $V_{AUX}$ of the auxiliary winding AUX starts to be reduced, so the current signal $I_{IN}$ is decreased gradually. Therefore, when the current signal $I_{IN}$ is lower than the reference current $I_{REF-TH}$, the voltage signal $V_{AUX}$ can be regarded as the minimum value, so the current comparator 58 enables a trigger signal $S_{DET}$. The time delay generator 62 provides a delay time to the trigger signal $S_{DET}$ to generate a delay signal $S_{DLY}$. A rising edge of the delay signal $S_{DLY}$ can make the pulse generator 64 generate a pulse which can set the SR register 50 to enable the gate signal $V_{GATE}$. Therefore, the power switch 15 can be turned on to enter another ON time $T_{ON}$ when the voltage signal $V_{AUX}$ is close to the minimum value. In the embodiment, the current comparator 58 can be regarded as a quadrature resonance detector to detect a discharge time of the auxiliary winding AUX to enable the trigger signal $S_{DET}$ through the pin QRD/OTP.

If the power controller 60 in FIG. 4 is implemented by a monolithic integrated circuit, the power controller 60 only needs the six pins VCC, GND GATE, CS, FB, and QRD/OTP. Therefore, the QR power supply 28 including the power controller 60 not only can operate in a QR mode without switching loss, but can also have the OTP function. Compared to the QR power controller 18 in FIG. 1, the QR power controller 60 can provide an addition protection (the OTP protection) to the QR power supply 28 without adding any pin.

In addition, the QR mode is not limited to being applied to a flyback converter, that is, the QR mode can be also applied to other type isolated converters. In addition, the present invention can be also applied to an isolated converter, such as a booster, a buck converter, a buck booster, and so on.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply, comprising:
  a power controller having a multi-function pin, an FB pin, a CS pin, and a gate pin, wherein the power controller is a monolithic integrated circuit;
  a power switch having a control terminal coupled to the gate pin, wherein the FB pin different to the CS pin and the multi-function pin is used for receiving a feedback signal corresponding to a voltage of an output terminal of the power supply;
  an auxiliary winding;
  a first circuit coupled between the multi-function pin and the auxiliary winding, wherein the first circuit has a diode; and
  a second circuit coupled between the multi-function pin and a ground line, wherein the second circuit has a thermistor coupled between the multi-function pin and the ground line, a resistance of the second circuit is varied with a resistance of the thermistor, and the resistance of the second circuit is used for determining whether an over temperature protection signal is enabled;

wherein when a voltage signal of the CS pin exceeds a value corresponding to the feedback signal, the power switch is turned off, and when the power switch is turned off, the power controller detects a discharge time of the auxiliary winding through the multi-function pin.

2. The power supply of claim 1, wherein the first circuit comprises the diode and a resistor, where the diode and the resistor are coupled between the multi-function pin and the auxiliary winding in series.

3. The power supply of claim 1, wherein the second circuit has the thermistor and a resistor, where the thermistor and the resistor are coupled between the multi-function pin and the ground line in series.

4. The power supply of claim 1, wherein the power controller detects a discharge time of the auxiliary winding through the multi-function pin when the power switch is turned off.

5. The power supply of claim 1, wherein the power controller detects a resistance of the second circuit through the multi-function pin when the power switch is turned on.

6. A power controller being a monolithic integrated circuit, the power controller comprising:
 a gate pin for outputting a gate signal;
 a CS pin for detecting a current flowing through a power switch controlled by the gate signal;
 an FB pin for receiving a feedback signal corresponding to a voltage of an output terminal of a power supply which the power controller is applied to, wherein when a voltage signal of the CS pin exceeds a value corresponding to the feedback signal, the power switch is turned off;
 a multi-function pin different to the FB pin and the CS pin coupled to a ground line through a thermistor;
 a resistance detector for detecting a resistance between the multi-function pin and the ground line when the gate signal is enabled, and enabling an over temperature protection signal when the resistance is lower than a predetermined value, wherein the resistance is varied with a resistance of the thermistor; and
 a quadrature resonance (QR) detector for detecting a discharge time of an external inductor through the multi-function pin to enable a trigger signal when the gate signal is disabled;
 wherein the trigger signal enables the gate signal, and the enabled protection signal keeps the gate signal not being enabled.

7. The power controller of claim 6, wherein the resistance detector outputs a fixed first current through the multi-function pin and detects a pin voltage of the multi-function pin when the gate signal is enabled, and the resistance detector enables the protection signal when the pin voltage is higher than a predetermined voltage.

8. The power controller of claim 6, wherein the QR detector detects an input current inputted from the multi-function pin when the gate signal is disabled, and the QR detector enables the trigger signal when the input current is smaller than predetermined current.

9. The power controller of claim 6, wherein the resistance detector comprises:
 a first current source for providing a first current outputted from the multi-function pin; and
 a voltage comparator for comparing a pin voltage of the multi-function pin with a predetermined voltage.

10. The power controller of claim 6, wherein the QR detector comprises:
 a current comparator for comparing an input current inputted from the multi-function pin with a predetermined current.

* * * * *